United States Patent
Muraoka et al.

[11] Patent Number: 5,834,112
[45] Date of Patent: Nov. 10, 1998

[54] ION CONDUCTIVE FILM AND PRECURSOR FILM THEREOF

[75] Inventors: Shigemitsu Muraoka; Masami Hamada, both of Nobeoka, Japan

[73] Assignee: Asahi Kasei Kogyo Kabushiki Kaisha, Osaka, Japan

[21] Appl. No.: 737,159

[22] PCT Filed: May 18, 1995

[86] PCT No.: PCT/JP95/00958

§ 371 Date: Feb. 26, 1997

§ 102(e) Date: Feb. 26, 1997

[87] PCT Pub. No.: WO95/31499

PCT Pub. Date: Nov. 23, 1995

[30] Foreign Application Priority Data

May 18, 1994 [JP] Japan ................................. 6-103631
Jun. 1, 1994 [JP] Japan ................................. 6-119768

[51] Int. Cl.⁶ ........................... B32B 5/16; B32B 27/08
[52] U.S. Cl. .................... 428/332; 428/35.4; 428/36.6; 428/474.4; 428/475.5
[58] Field of Search ......................... 428/474.4, 475.5, 428/35.4, 36.6, 332

[56] References Cited

FOREIGN PATENT DOCUMENTS 2-34661A  2/1990  Japan .
3-9931A   1/1991  Japan .

*Primary Examiner*—Leszek Kiliman
*Attorney, Agent, or Firm*—Finnegan, Henderson, Farabow, Garrett & Dunner, L.L.P.

[57] ABSTRACT

An ion conductive film and a precursor thereof which comprises a film composed of an aromatic polyamide, electrolyte and solvent in which a content of the aromatic polyamide is between 20 and 70% by weight. The film is easy to handle due to heat resistance, resistance to chemicals and mechanical properties. Little deterioration of the properties, or change in the structure of the film is caused by aging and exposure to heat. The film is especially suited for various electrochemical usages including battery separator.

9 Claims, No Drawings

ION CONDUCTIVE FILM AND PRECURSOR FILM THEREOF

FIELD OF THE INVENTION

This invention relates to an ion conductive film capable of being used as a solid electrolyte for use in electrochemical applications such as an alkali secondary battery or the like. More precisely it relates to an ion conductive film having an excellent properties of resistance to heat and mechanical properties as well as a reduced deterioration of these properties under aging or heating and a reduced morphological change.

BACKGROUND OF THE INVENTION

Heretofore, there have been used micro-porous membrane and nonwovens fabrics of aliphatic polyamides, polypropylene, polyethylene, polysulfone have been used as materials for separators for an alkali secondary battery. Since a battery using these kinds of materials may encounter problems of resistance to oxidation and lacks of resistance to heat, other problems may occur such as minute short circuits causing a separator to melt due to the heat generated thereby, triggering successively greater short circuits causing further violent heat generation; ejection of the electrolytic solution or decomposed product thereof from the container of a battery forcibly heated by the heat resulting in break-down of an appliance in which the battery is loaded.

In order to solve these problems, attempts to use aromatic polyamides having no glass transition temperature and properties of resistance to heat and chemicals have been disclosed in Japanese Unexamined Patent Publication No. 58-147956, No. 5-290822 and No. 5-335005. However, the separators disclosed in these publications are laminations with fibers or fibrillated pulp-like materials because they need to have gas permeable fine pores for maintaining conductivity of electrolyte. The laminations are formed forcibly by melting the structural components by means of an ultrasonic or heat welding technique since a mere lamination of the layers lacks mechanical strength. It is difficult to obtain a laminate with sufficient mechanical strength since an aromatic polyamide is hard to bond by a melt-bonding technique because the polymeric material does not exhibits melting point. When these laminates are reinforced by means of a thermo-bonding technique with addition of another thermoplastic polymeric substance, the amount of pores becomes reduced in reinforced laminates so that the ultimately required characteristic of ion conductivity cannot be ensured. For this reason, such laminates have a disadvantage in that sufficient discharge capacity cannot be obtained due to an increased internal resistance.

There are known electrically conductive films which incorporated carbon or the like. Such films are electron conductive by nature, but not ion conductive as intended in the present invention.

Research and development work directed to utility of ion conductive film has been carried out as reported by J. V. Wright showing that an alkali metal-polyethylene oxide complex exhibits ion conductivity (British Polymer Journal, P319, Vol.2, 1975). A problem, however, is that the ion conductive film has poor ion conductivity as compared with a liquid type electrolyte. The film must be made smaller in thickness to improve ion conductivity. A satisfactory mechanical strength has not been attained simultaneously with the requirement for thickness. It is also required that a polymer needs to have a lower glass transition point in view of ion mobility. Consequently, an ion conductive film of the polymer produces a greater change in shape and a greater reduction in mechanical strength when the material is under heat.

In the meantime, Japanese Unexamined Patent Publication Nos. 1-309205, 2-86658 and 3-37268, proposed gel-like ion conductive films prepared from a non-ion conductive matrix such as a polysulfone and polyparabane acid or the like as carriers to which an electrolyte, is added, if necessary, with addion of a solvent. The ion-conductive film disclosed in these publications can be prepared by dissolving electrolyte and matrix polymer in a solvent followed by removal of the solvent. However, it is difficult to use a more thinner film having a higher ionconductivity made of the gel-like film as a solid electrolytic material for a battery since tenacity of the film is reduced when amount of electrolyte and solvent increases in the film.

It is, therefore, an object of the present invention to provide an ion conductive film that is durable to heat for use for a battery separator capable of making a safe battery which will not eject both electrolytic liquid and gaseous decomposition products thereof from the container of a battery due to melting of the separator material in the event that temperature of a battery is elevated for some reason.

From a practical point of view, the object of the present invention is to provide an ion conductive film substantially free from both structural change and deterioration of characteristics either due to heat or aging encountered during use, having an excellent handling properties during manufacturing and an improved durability to heat and mechanical properties.

DISCLOSURE OF THE INVENTION

The first aspect of the present invention is an ion conductive film composed of a film comprising an aromatic polyamide, electrolyte and solvent in which the aromatic polyamide is contained in an amount of 20 to 70% by weight, and in particular a film comprising an aromatic polyamide incorporated with an organic solvent either of a low molecular compound or a polymer which is capable of dissolving an electrolyte.

The second aspect of the present invention is an ion conductive laminated film characterized by a film composed of an aromatic polyamide incorporated with an electrolyte and a solvent therein in which the aromatic polyamide is contained in an amount of 20 to 70% by weight and at least one side of said film has a layer composed of polymeric compound and an electrolyte.

The third aspect of the present invention is a precursor film capable of converting itself by dissolving alkali metal salt into an ion conductive film in which the film is composed of an aromatic polyamide contained in an amount of 20 to 70% by weight.

The fourth aspect of the present invention is a precursor laminated film characterized in that the film is composed of an aromatic polyamide and a low or high molecular organic solvent capable of dissolving alkali metal salt in which the aromatic polyamide is contained in an amount of 20 to 70% by weight and said film has a layer capable of dissolving an alkali metal salt at least one side of the film.

An aromatic polyamide forming the film of the invention is a polymeric substance having such heat resistat property at an elevated temperature as that the polymer does not cause any short circuit problem due to melting when the polymer is used as a battery separator and is an aromatic polyamide capable of forming a film by a dry filming system or a wet filming system using the polymer dissolved in a solvent. An aromatic polyamide either having a melting point of 250° C. or more, or having no specific melting point can be preferably employed. Generally, an employable aromatic polyamide can be selected from aromatic polyamides having an inherent viscosity (a value measured in $H_2SO_4$ at 25° C., C =0.5 g/dl) ranging from 2.5 to 8.5 or more. The polyamide as mentioned herein is composed substantially of constituent units selected from the group of the following recurring units:

  (1)

  (2)

  (3)

Here, $Ar_1$, $Ar_2$ and $Ar_3$ contain at least one aromatic ring nucleus, and can be either the same or different from each other. Representative examples are as follows:

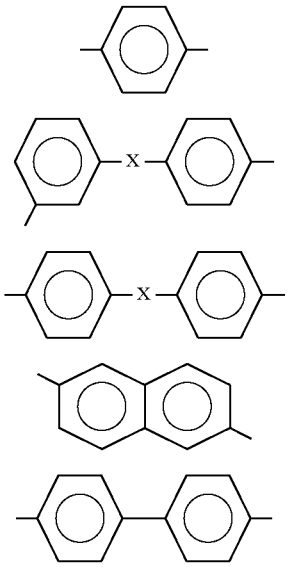

Part of the hydrogen atoms connected on these aromatic rings can be substituted by halogen, nitro, alkyl, alkoxy, groups or the like, and X represents —O—, —$CH_2$—, —$SO_2$—, —S—, —CO— or the like.

An aromatic polyamide in which at least 80 mole% of the whole aromatic ring in the polymer is linked at para position is especially preferred to enhance mechanical properties of a film according to the present invention.

Such an aromatic polyamide can be prepared using an aromatic dicarboxylic acid or aromatic diacid chloride, and an aromatic diamine as monomeric raw materials by an application of a low temperature polymerization technique described in U.S. Pat. No. 4,308,374 or the like.

An aromatic polyamide composing a film structure according to the present invention is contained in an amount ranging from 20 to 70% by weight of the film structure. When the content of the polymer is below 20% by weight, mechanical strength of a film cannot be enough to withstand in a practical use. When the amount of the polymer exceeds 70% by weight, the amount of electrolyte in the film structure is not enough to obtain a film having a practically required level of ion conductivity.

The balance of the remaining component forming the film structure is made up of an electrolyte solution or a solvent capable of dissolving the electrolyte.

As an electrolyte in the present invention, an ionizable inorganic salt can generally be used. Alkali metal salts are preferably used in order to electrical conductivity. As employable salts, for example, in a case where an organic solvent is used as in an alkaline secondary battery, there may be used, singly or in a mixture, $LiBF_4$, $LiClO_4$, LiCl, NaCl, KCl, $LiSO_3CF_3$, $LiNO_3$, $LiCH_3CO_2$, LiF, $Li_2CO_3$, $Li_2SO_4$ or the like, not only for a non-aqueous system but also in an aqueous system. Further, in a case where an aqueous solvent is employed, an aqueous solution of an acidic or alkaline substance such as NaOH, KOH, $H_2SO_4$, can be used. In a non-aqueous electrolyte solution, a combined use of a small quantity of water may be applied if necessary in order to enhance electro-conductivity. An employable solvent in the invention can include any compounds capable of dissolving electrolyte in dissociated form, for example water, a low molecular organic compound and a high molecular organic compound. A solvent can be either of liquid or of solid when it is at service.

Examples of low molecular organic compound employable as a solvent, although not limited to these, includes, for examples ethylene carbonate, propylene carbonate, butylene carbonate, dimethylcarbonate, tetrahydrofuran, 2-methyltetrahydrofuran, 3-methyl-2-oxazidione, dimethylsulfoxide, sulfolane, acetonitrile, γ-butylolactone, γ-valerolactone, 1,2-dimethoxyethane, 1,3-dioxolane and the like. These compound may be used singly or in a mixture thereof as frequently practiced. It is noted that a choice of any specific solvent should be made in accordance with kind of electrolyte to be used.

A high molecular organic compound employable as a solvent is a high molecular organic compound capable of dissolving electrolyte. The high molecular organic compound has a soft molecular chain in the molecule and exhibits a low glass transition point. Examples of the high molecule are polyethers such as polyethylene oxide and polypropylene oxide or the like, aliphatic polyesters such as polyethyleneadipate and polyethylenesuccinate and the like, polyimine such as polyethyleneimine and polypropyleneimine or the like, ether based macromolecule cross-linked by irradiation or a cross-linking agent such as diisocyanates and dicarboxylic acid chlorides, polyether derivatives of polyphosphazene or polysiloxane, polycarbonate and the like.

The concentration of the electrolyte solution of the invention is not limited and may be determined, optionally at any concentration capable of achieving a satisfying intended effect of the invention considering the affinity between a solvent and a specific electrolyte to be used. Since there can be an optimum concentration for a specific combination of respective ionizable substances with respective solvents, a concentration in the vicinity of the optimum condition can preferably be used. Generally, use is made of a concentration ranging from 0.05 to 50%, preferably from 0.05 to 10%. A preferred concentration, although differing in accordance with kinds of ionizable substances, is for example between 0.5 and 2.0% by weight in the case of lithium chloride.

The combination of the above-mentioned high molecular organic compound solvent and with a low molecular organic compound solvent capable of dissolving an afore-mentioned ionically dissociative substance has been known as a dissociative plasticized high molecular substance or a gelled high molecular dissociative substance, and use of these ion dissociative substances is preferable. They promote the ionic dissociation of an electrolyte and enhance ion conductivity by promoting the activity of segment of the high molecular organic compound by the addition of the low molecular organic compound solvent. As an example of these compound other than the above-mentioned polymeric material, there is other such combination of a polyacrylonitrile or a copolymer with an electrolyte solution, and it is expected that such a combination usable for the invention will be found in the future. The ratio by weight of such high molecular compound to an electrolyte solution may be chosen within a range from 1:10 to 10:1, although the range is not limitative.

One preferred embodiment of the present invention is an ion conductive laminated film in which a layer of a high molecular organic compound containing an electrolyte is provided on at least one side of the aforementioned film structure in order to facilitate an easy connection or contact of the ion conductive film with an electrode or the like. In this embodiment, the high molecular organic compound containing electrolyte formed on the surface of the film and the high molecular organic compound forming the film together with an aromatic polyamide can be either of the identical composition, or of different compositions. The thickness of the high molecular organic compound layer containing the electrolyte formed on the surface is, although not limitative, preferably at least 0.1 $\mu$m or greater in view of the connection or contact with an electrode, and it is preferably 10 $\mu$m or less in view of ion conductivity as an ion conductive film.

In a practice of the present invention, it is possible that the impregnation of film with the electrolyte is carried out after either a film comprising an aromatic polyamide and the aforesaid low molecular organic solvent and/or a high molecular organic compound solvent, or a laminated film comprising a layer of a high molecular compound or a high molecular compound and a low molecular compound laminated on at least one surface of the former (the first) film is prepared as a precursor film. In case where use is made of an electrolyte which is easily denatured or decomposed for example by hydrolysis, the imbibition or impregnation can be carried out preferably by adding an ionically dissociative substance in the form of a solution after the film is incorporated into a final battery assembly or the like.

A film of the present invention has a structure in which an electrolyte is dissolved in the so-called swollen gel of an aromatic polyamide swollen by a solvent. The film in its entirety has a property of ion conductivity and differs basically from a non ion conductive paper-like separator through the pores of which an electrolyte solution is made to permeate. A film of the present invention does not need to be gas permeable, and it generally has an air permeability of 1000 second/100 cc or greater as determined according to the measurement of gas permeability for separator defined by JIS-P-8117 (Gurly densometer method). Gas permeable paper-like or sponge-like materials conventionally available which have minute pores in the structure have an air permeability of 500 seconds/100 cc or less and exhibit a considerable amount of pores or interstices. In the interstices, a slight crystal development and growth of the electrolyte occurs so that short circuiting, for example of electrode comes about easily. Gas permeability for the film of the invention is preferably 5000 seconds/100 cc or more. Since the film has practically no gas permeability, there are no interstices or pores which would allow a crystal product to develop and grow in the film. Nevertheless the film is excellent in ion conductivity and exhibits a reduced deterioration of properties for a prolonged duration because there is no crystal growth whereby a longer period of safe performance can be ensured.

The film of the present invention has preferably a nitrogen gas permeability as determined according to ASTM D-1434 of $2\times10^7$ $cm^3/m^2$19 24h·atm or less, more preferably $2\times10^6$ $cm^3/m^2$·24h-atm or less.

Ion conductivity of the present film depends on the kind of electrolyte and solvent used and the contents thereof, and a preferred ion conductivity is $1\times10^{-4}$ S·cm$^{-1}$ or more; a more preferred ion conductivity is $1\times10^{-3}$ S·cm$^{-1}$ or more. In general, it is less than 10 S·cm$^{-1}$.

Although conductivity of the present film is not limited since it depends on ion conductivity and thickness of film, a film having a smaller resistivity is preferred. In general, use is preferably made of a film exhibiting a resistivity of 5000Ω or less as measured by a conventionally available tester.

The thickness of a film of the invention is, although not specifically limited, preferably as thin as it can be in order to obtain a reduced electric resistance. Generally, use is preferably made of a thickness ranging from 3 to 100 $\mu$m. For the use as a solid electrolyte for making a battery, for example, a thickness of 10 to 30 $\mu$m is generally selected.

A feature of the film of the invention resides in the mechanical properties attributable to a heat resistant resin, especially aromatic polyamide resin; Normally, tensile strength is 1 to 1000 kg/cm$^2$ a tensile strength of 10 kg/cm$^2$ or more is preferably used. Also, it is preferable that a film of the invention has a tensile elongation of 50 to 300% as well as a tensile elastic modulus of 50 to 5000 kg/cm$^2$. A film of the invention has an excellent heat resistant properties, and accordingly the film has a higher deformation temperature as well as a higher melting point than a conventional polymer electrolyte film or micro-porous membrane of polyethylene. In a case where polyparaphenyleneterephthalamide (hereinafter called PPTA) is used as an aromatic polyamide, the obtained film has no specific melting point and does not exhibit any appreciable deformation, for example, shrinkage, even at a temperature above 200° C. The film of the invention can contain a lubricant, unless the film is deteriorated or it is contradictory to the object of the invention, for example, $SiO_2$, $TiO_2$, ZnO, $Al_2O_3$, $CaSO_4$, $BaSO_4$, $CaCO_3$, carbon black, zeolite, powders of another metal, for example inorganic compounds, anti-oxidant, other additives, for example, dyestuff and pigment, fire retardant additives, other modifiers, and high molecular compounds other than those mentioned above.

The process for producing a film of the present invention is not specifically limited. Any suitable process for combination of an aromatic polyamide with electrolytes may be selected.

In a case where an aromatic polyamide is soluble in an organic solvent, a solution for shaping can be prepared either directly by polymerizing in the solvent followed by refining, for example by means of neutralization, or by dissolving a once separated polymer from the polymerization in a solvent for shaping. After a film is formed from the solution by a dry or wet system, the remaining solvent used for the film-forming in the film or a washing liquid such as water is substituted by an electrolyte solution. Or, in a case where the aromatic polyamide is soluble in an electrolyte solution, the polymer can be dissolved directly in the electrolyte solution, and thereafter film forming is carried out by a dry or wet film forming system. Or, in a case where an aromatic polyamide is difficult to dissolve in an organic solvent, a solution for shaping is prepared by dissolving the aromatic polyamide in, for example, a concentrated sulfuric acid, and then a film forming is carried out by a wet film forming system, and the obtained film is soaked in an electrolyte solution so that the water contained in the film is substituted by an electrolyte solution.

When a solution exhibits a liquid crystal nature as in the case of PPTA, for example, a film is prepared by a process in which a film of a liquid crystal solution of PPTA, for example, extruded through a die is coagulated followed by drying after the extruded film is once converted into an isotropic liquid as described in U.S. Pat. No. 4,752,643. Using this process, a PPTA film of the invention, which is especially excellent in mechanical properties, can be obtained by soaking an aqueous swollen film immediately before being dried in an electrolyte solution for effecting the replacement.

The replacement by an electrolyte solution, if carried out continuously, can be performed by bringing the film into contact with the electrolyte solution for from 5 seconds to 10 minutes. A batch system may be employed for the replacement treatment for a longer time. The temperature employed for the replacement is normally about 0° C. or greater but below the boiling point of the solvent. In a case where the boiling point of a solvent is above 100° C., the replacement can be performed preferably at a temperature above 100° C. but below the boiling point of the solvent by dissipating by the vaporization of water originally contained in the film. If a temperature applied for the replacement is too high, it is probable that some change in the physical structure of a film may be encountered due to shrinkage and heat-decomposition of the film. A temperature of below about 150° C. is generally selected.

A film impregnated with an electrolyte solution contains an electrolyte dissolved in a swollen gel structure composed of an aromatic polyamide and solvent, and therefore the film as such can be used as an ion conductive film. It is found that a film having a desirable composition can be obtained by vaporizing the solvent by means of a heated drying or vacuum drying technique. As an example, any residual water left in a film obtained by replacing the water using a solvent having a boiling point of 100° C. or higher, can be removed totally by heat drying. Also, removal of some superficially attached solvent can be performed by drying at a selected temperature while the solvent remaining deep in the structure of a film is maintained in the core part of the film. It is noted that a solvent contained in a film is harder to dry than a solvent superficially attached to the surface of the film. Care should be taken even in such a case because ion conductivity of a film may possibly be reduced due to a reduced amount of solvent if drying temperature is elevated excessively. For this reason, the drying of film is normally carried out at a temperature below the boiling point of a solvent for an electrolyte for 5 seconds to 30 minutes. If necessary, superficial electrolyte in the film may be removed. Means for removing the superficially attached electrolyte include, for example, wiping with a wiper, blowing off with a high speed flow of air, or squeezing off by holding the film between a pair of rubber rolls and the like.

An optional use can be made of any method of preparation of an ion conductive film composed of an aromatic polyamide, an electrolyte and a high molecular compound. Such a method of preparation includes, for example, a method in which an electrolyte is diffused after a film is formed using a solution for film-forming prepared by dissolving a mixture of an aromatic polyamide and a high molecular compound, a method in which a film is first formed only from an aromatic polyamide and then a solvent used for the film-forming or a washing liquid such as water which is contained in the film is replaced either by a solution prepared by dissolving a high molecular compound and electrolyte in an adequate solvent or a molten high molecular compound by heating; and a method in which a monomer is polymerized in an aromatic polyamide film after a replacement of the monomer is made by a method similar to the above method employed for replacement by electrolyte solution, and an electrolyte solution is impregnated into the film. Also, a method in which a high molecular compound in a film is cross-linked by irradiation of radiation can be used.

For a preparation of a film or precursor film having a layer of a high molecular compound containing an electrolyte or a laminated precursor layer on at least one surface thereof, there is no method restricted. Various methods or means can be employed. There are, for examples, a method in which a high molecular compound or high molecular compound containing an electrolyte is coated on a film prepared by any of the aforesaid methods; a method in which a swollen film obtained by using a solution containing only an aromatic polyamide is contacted with a high molecular compound, a high molecular compound containing an electrolyte or a solution thereof for replacement of the solvent or washing liquid originally contained in the film to obtain a film on the surface of which the high molecular compound or high molecular compound with addition of the electrolyte remains in the form of a layer.

Although one feature of an ion conductive film of the present invention resides in its excellent heat resistance as already explained, it is possible that ionic conduction through the film is hampered in case where an abnormal temperature rise occurs in actual use. Therefore, it is allowable in one mode of application that the film can be used together with a microporous film made of polyethylene or the like having a low melting point.

BEST MODE FOR CARRYING OUT THE INVENTION

In the following, for understanding the advantageous merits of the invention, examples are given using polyparaphenyleneterephthalamide (PPTA) as a representative of a para-aramid. These examples are not presented to limit the scope of the invention.

First, a method of measurement of properties of ion conductive film is described below.

(1) Concentration of aromatic polyamide

Concentration of aromatic polyamide was determined by measuring the weight of a film while the temperature of the film was raised up to 450° C. at a rate of 10° C./min. The measurement was carried out using Type DTA 220 Thermogravimeter available from SEIKO Instrument Inc. The measurement was made on the film obtained after electrolyte contained in a sample film was removed by washing with water or ethyl alcohol for 24 hours using a Soxhley's extractor.

(2) Electric resistance

Electric resistance was measured using a circuit tester available from SANWA Electric Company. The measurement was carried out by placing the electrode rods on both sides of a sample film at atmospheric temperature of 20° C. while the tester was set to the mode for electric resistance measurement.

(3) Ion conductivity

Ion conductivity was measured at a frequency of 500 KHz at an atmospheric temperature of 20° C. with the use of a Hewlett Packard 4284A LCR meter.

(4) Measurement of thickness, strength, and elongation and elastic modulus of a film Thickness of a film was measured by a dial gauge DG-925, available from ONO SOKKI Company with a measuring plane having a diameter of 2 mm.

Strength, and elongation and elastic modulus of a film were measured with a measuring grip length of 30 mm at a drawing speed of 30 mm/minute, using a constant speed elongation type stress-strain measuring machine, TYPE DSS available from SHIMAZU Manufacturing Works.

(EXAMPLE 1)

As an aromatic polyamide, a polyparaphenyleneterephthalamide (PPTA) having an inherent viscosity of 5.5 was dissolved in a 99.8% concentrated sulfuric acid into a solution having a polymer concentration of 12% by weight. The solution was cast through a die on an endless belt conveyor. The cast film was heated simultaneously with a moisture absorption treatment to convert the liquid crystal phase of the cast dope into the isotropic phase. The cast dope was then coagulated in a 40% aqueous sulfuric acid solution at 0° C., and the coagulated film was then washed, neutralized followed by washing and was wound up to obtain a transparent water swollen PPTA film.

The washed, aqua-wetted film (a never dried film) was then soaked in a bath of an electrolyte solution prepared by dissolving 1% by weight of LiCl in a polyethylene oxide (with a mean molecular weight of 300) at 120° C., for 3 minutes. Thereafter, the soaked film was taken out of the bath and both faces of the film replaced with electrolyte were wiped by means of tissue paper.

The obtained film was a swollen gel-like film having a thickness of 30 $\mu$m. The ratio by weight of components PPTA/polyethyleneoxide/LiCl in the film was 0.440/0.544/0.006. The value of gas permeability of the film measured according to the Gurly densometer method defined in JIS P8117 exceeds the dynamic scale range of the measurement, and the value of gas permeability of the film determined at 22° C. using nitrogen gas according to ASTM (American Society for Testing and Materials) D1434 exhibited 4600 $cm^3/m^2 \cdot 24h \cdot atm$, which means no gas permeability. The electric resistance of the film was 3000$\Omega$. The mechanical properties of the film in both lengthwise and crosswise directions exhibits sufficient toughness; the film measured 40.32 $kg/cm^2$ in strength, 82, 76% in elongation and 240, 290 $kg/cm^2$ in elastic modulus respectively.

(EXAMPLE 2)

A water-swollen PPTA film prepared by the same manner as in Example 1 was soaked in a 0.4% by weight aqueous sodium hydroxide solution at room temperature for 5 minutes. The obtained film was a swollen gel-like film having a thickness of 33 $\mu$m. The ratio by weight of components PPTA/water/NaOH in the film was found to be 0.250/0.747/0.003, respectively.

The value of gas permeability of the film measured according to the Gurley densometer method defined in JIS P8117 exceeds the dynamic scale range of the measurement, and the value of gas permeability of the film determined at 22° C. in nitrogen gas according to ASTM D1434 was found to be 3840 $cm^3/m^2 \cdot 24h \cdot atm$, which mean no gas permeability. The electric resistance of the film was 400$\Omega$. The mechanical properties of the film were found to be 35 $kg/cm^2$ in strength, 85% in elongation and 300 $kg/cm^2$ in elastic modulus.

(EXAMPLE 3)

A water-swollen PPTA film prepared by the same manner as in Example 1 was soaked in an electrolyte bath maintained at a temperature of 110° C. for 5 minutes. The electrolyte bath was composed of 2% by weight of $LiNO_3$ dissolved in a polyethylene oxide (mean molecular weight 300). Thereafter, the film replaced with the electrolyte solution was taken out from the bath, and the surface of the film was dried in an oven maintained at 150° C. for about 30 minutes to obtain a transparent film.

The obtained film was a swollen gel-like film having a thickness of 60 $\mu$m. The ratio by weight of components PPTA/water/NaOH in the film was found to be 0.55/0.44/0.01, respectively.

The value of gas permeability of the film measured according to the Gurly densometer method defined in JIS P8117 exceeds the dynamic scale range of the measurement, and the value of gas permeability of the film determined at 22° C. using nitrogen gas according to ASTM D1434 was found to be 4730 $cm^3/m^2 \cdot 24h \cdot atm$; namely the film had practically no gas permeability. The electric resistance of the film was found to be 4000$\Omega$. The mechanical properties of the film were found to be 38 $kg/cm^2$ in strength, 75% in elongation and 350 $kg/cm^2$ in elastic modulus. The film was flexible and had a sufficiently tough nature.

(EXAMPLES 4–10)

Water-swollen PPTA films prepared by the same manner as in Example 1 were soaked in polyethylene oxides having molecular weights ranging from 300 to 7500 for 5 minutes. The soaked films were placed in an oven at 150° C. for about 30 minutes to dry their respective surfaces to obtain transparent films.

The films were then immersed in an electrolyte solution prepared by dissolving $LiBF_4$ at a concentration of 1.5 mol/l in a mixed solvent (PC : EC : BL) in which propylene carbonate (PC), ethylene carbonate (EC) and $\gamma$-butyl lactone (BL) were mixed at a ratio by volume of 25:25:50. Ion conductivity of respective films obtained was measured. The results are shown in Table 1. The ratio by weight of respective components PPTA/PC/EC/BL/$LiBF_4$ in the film was 0.30/0.17/0.16/0.30/0.07, respectively. The films were swollen gel-like films. The films were flexible and had a sufficiently tough nature.

(EXAMPLES 11–14)

A water-swollen PPTA film prepared by the same manner as in Example 1 were soaked in ethylene carbonate or polycarbonate solutions of propylene carbonate (the compositions are tabulated in Table 2) for 5 minutes, and thereafter respective surfaces of the soaked films were dried to obtained transparent precursor films. The films were then immersed in an electrolyte solution prepared by dissolving $LiBF_4$ at a concentration of 1.5 mol/l in a mixed solvent (PC : EC : BL) in which propylene carbonate (PC), ethylene carbonate (EC) and $\gamma$-butyl lactone (BL) were mixed at a ratio by volume of 25:25:50. Ion conductivity of respective films obtained was measured. The results are shown in Table 2. The ratio by weight of respective components PPTA/PC/BL/$LiBF_4$ in the film was 0.15/0.14/0.27/0.07, respectively. The films were swollen gel-like films. The films were flexible and had a sufficiently tough nature.

TABLE 1

| No. | Polyethylene oxide molecular weight | Thickness ($\mu$m) | Ion conductivity $S \cdot cm^{-1}$ |
|---|---|---|---|
| Example 4 | 300 | 32 | $2.0 \times 10^{-3}$ |
| Example 5 | 1000 | 31 | $1.8 \times 10^{-3}$ |
| Example 6 | 2000 | 32 | $1.8 \times 10^{-3}$ |
| Example 7 | 2000 | 17 | $3.0 \times 10^{-3}$ |

TABLE 1-continued

| No. | Polyethylene oxide molecular weight | Thickness (μm) | Ion conductivity S · cm$^{-1}$ |
|---|---|---|---|
| Example 8 | 2000 | 7 | $1.0 \times 10^{-3}$ |
| Example 9 | 4000 | 32 | $2.0 \times 10^{-3}$ |
| Example 10 | 7500 | 32 | $1.6 \times 10^{-3}$ |

TABLE 2

| No. | Composition | Ratio by Weight | Thickness (μm) | Ion conductivity S · cm$^{-1}$ |
|---|---|---|---|---|
| Example 11 | Ethylene carbonate | | 30 | $1.5 \times 10^{-3}$ |
| Example 12 | Polycarbonate (Molecular Weight 2000)/Propylene carbonate | 20/80 | 31 | $1.1 \times 10^{-3}$ |
| Example 13 | Polycarbonate (Molecular Weight 4100)/Propylene carbonate | 20/80 | 33 | $1.2 \times 10^{-3}$ |
| Example 14 | Polycarbonate (Molecular weight 4100)/Propylene carbonate | 30/70 | 33 | $1.6 \times 10^{-3}$ |

(EXAMPLES 15)

On an ion conductive film prepared in Example 1, a solution prepared by dissolving 5% by weight of LiCl in a polyethylene oxide (mean molecular weight of 20000) which was heated at 120° C. was coated with a thickness of 5 μm and thereafter the coated film was dried to obtain an ion conductive laminated film.

The obtained ion conductive laminated film had a thickness of 35 μm. The film had a gas permeability of 4900 cm/m$^2$ ·24h·atm measured at 22° C. using nitrogen gas according to ASTM D1434; i.e., the film had practically no gas permeability. The electric resistance of the film was found 3400Ω. The mechanical property of the film in both lengthwise and crosswise directions is sufficiently tough in nature; the film measured 37 kg/cm$^2$, 29 kg/cm$^2$ in strength, 72%, 69% in elongation and 220 kg/cm 220 kg/cm$^2$ in elastic modulus respectively for lengthwise and crosswise directions of the film.

(EXAMPLES 16)

A water-swollen PPTA film produced in the same manner as in Example 1 was soaked in a polyethylene oxide having a molecular weight of 300 for 5 minutes and thereafter the surface of the soaked film was dried in oven at 150° C. for about 30 minutes. The dried film was further coated on its surface with a polyethylene oxide having a molecular weight of 20000 heated at 120° C. in a thickness of 5 μm to obtain a laminated precursor film.

The precursor film was then immersed in an electrolyte solution prepared by dissolving LIBF$_4$ at a concentration of 1.5 mol/l in a mixed solvent (PC : EC : BL) in which propylene carbonate (PC), ethylene carbonate (EC) and γ-butyl lactone (BL) were mixed at a ratio by volume of 25:25:50, for about 30 seconds. Ion conductivity of the film obtained was found to be $2.5 \times 10^{-3}$ S·cm$^{-1}$.

INDUSTRIAL APPLICABILITY

The ion conductive film of the invention can provide a film having a low electric resistance for a variety of electrochemical applications because a thin film is made obtainable by making use of an aromatic polyamide film characterized by excellent mechanical properties. The excellent mechanical properties of the film of the invention facilitate handling in various uses where use of the film is related to assembly of appliances. Therefore, a reduction of the operational cost is possible in these fields of use.

The ion conductive film of the invention can provide a film free from short circuit troubles for a variety of applications because the film can neither melt, nor deform when exposed to elevated temperatures. This advantageous merit of the present invention is attained by making use of an aromatic polyamide featured by high resistance to heat and resistance to chemicals. With use of this featured property of aromatic polyamide, the properties of the ion conductive film of the invention are durable under exposure to heat and do not deteriorate over a long periods of time.

The film of the present invention exhibits the featured advantageous merits in broader electrochemical uses including, for example, battery, condenser, electroluminescence display, photocell, various sensors and the like.

We claim:

1. An ion conductive film which comprises a film composed of an aromatic polyamide, electrolyte and solvent, a content of the aromatic polyamide in the film being between 20 and 70% by weight wherein the film has a thickness of from 3 to 100 μm, a tensile strength of 10 kg/cm$^2$ or more and a gas permeability as measured according to ASTM D-1434 of $2 \times 10^{-7}$ cm$^3$/m$^2$·24h·atm or less, wherein the aromatic polyamide either has a melting point of 250° C. or more or has no specific melting point.

2. An ion conductive film as claimed in claim 1, wherein the electrolyte is an alkali metal salt and the solvent is a low molecular organic compound.

3. An ion conductive film as claimed in claim 1, wherein the electrolyte is an alkali metal salt and the solvent is a high molecular compound.

4. An ion conductive film as claimed in claim 1, wherein the electrolyte is an alkali metal salt and the solvent is a mixture of a low molecular organic compound and a high molecular compound.

5. An ion conductive laminated film which comprises a film composed of an aromatic polyamide, electrolyte and solvent in which a content of said aromatic polyamide is in a range of 20 to 70%, the film having a layer of a high molecular organic compound containing an electrolyte on at least one surface of said film wherein the film has a thickness of from 3 to 100 μm, a tensile strength of 10 kg/cm$^2$ or more and a gas permeability as measured according to ASTM D-1434 of $2 \times 10^{-7}$ cm$^3$/m$^2$·24h·atm or less, wherein the aromatic polyamide either has a melting point of 250° C. or more or has no specific melting point.

6. An ion conductive laminated film as claimed in claim 5, wherein the electrolyte is an alkali metal salt and the solvent is a high molecular compound.

7. An ion conductive laminated film as claimed in claim 5, wherein the electrolyte is an alkali metal salt and the solvent is a mixture of a high molecular compound and a low molecular organic compound.

8. A precursor film which comprises a film composed of an aromatic polyamide and a low molecular or high molecular organic solvent capable of dissolving an alkali metal salt, said aromatic polyamide being contained in an amount of 20 to 70% by weight wherein the film has a thickness of from 3 to 100 μm, a tensile strength of 10 kg/cm$^2$ or more and a gas permeability as measured according to ASTM D-1434 of $2 \times 10^{-7}$ cm$^3$/m$^2$·24h·atm or less, wherein the aromatic polyamide either has a melting point of 250° C. or more or has no specific melting point.

9. A precursor laminated film which comprises a film composed of an aromatic polyamide and a low molecular or high molecular organic solvent capable of dissolving an alkali metal salt, said aromatic polyamide being contained in an amount of 20 to 70% weight, said film having a layer of a high molecular organic compound capable of dissolving alkali metal salt on at least one surface thereof wherein the film has a thickness of from 3 to 100 μm, a tensile strength of 10 kg/cm$^2$ or more and a gas permeability as measured according to ASTM D-1434 of $2 \times 10^{-7}$ cm$^3$/m$^2$·24h·atm or less, wherein the aromatic polyamide either has a melting point of 250° C. or more or has no specific melting point.

* * * * *